United States Patent [19]

Larson et al.

[11] 3,800,061

[45] Mar. 26, 1974

[54] COMPOSITE CONDUCTOR CONTAINING SUPERCONDUCTIVE WIRES

[75] Inventors: Warren L. Larson, Lexington; James Wong, Wayland, both of Mass.

[73] Assignee: Norton Company, Worcester, Mass.

[22] Filed: Mar. 5, 1969

[21] Appl. No.: 807,166

Related U.S. Application Data

[63] Continuation of Ser. No. 534,177, March 14, 1966, abandoned.

[52] U.S. Cl....... 174/15 C, 174/DIG. 6, 174/126 CP

[51] Int. Cl............................................. H01v 11/08

[58] Field of Search........... 29/191.4, 599; 174/126, 174/15 C, 126 R, 126 CP

[56] References Cited

UNITED STATES PATENTS

| | | | |
|---|---|---|---|
| 1,125,162 | 1/1915 | Page | 29/191.4 |
| 1,292,659 | 1/1919 | Speed | 29/191.4 |
| 3,253,191 | 5/1966 | Treuting et al. | 317/158 |
| 3,306,972 | 2/1967 | Laverick | 174/126 |
| 3,366,728 | 1/1968 | Garwin | 174/126 |
| 3,370,347 | 2/1968 | Garwin | 29/599 |
| 3,378,916 | 9/1968 | Robinson | 29/599 |

*Primary Examiner*—E. A. Goldberg
*Attorney, Agent, or Firm*—Jerry Cohen; Charles Hieken; Oliver W. Hayes

[57] ABSTRACT

A superconductor cable substitute made by co-working multiple rods of superconductive niobium-titanium or niobium-zirconium alloy with a common copper matrix to extend the copper and rods to form a final elongated product which has superconductive wires distributed in a reduced cross-section copper conductor with a complete metallurgical bond between the normal-conductive copper and the superconductor wires contained therein. The super conductor cable can be in the form of a tube.

6 Claims, 8 Drawing Figures

INVENTOR.

BY

COMPOSITE CONDUCTOR CONTAINING SUPERCONDUCTIVE WIRES

This application is a continuation of U.S. Pat. application Ser. No. 534, 177 filed Mar. 14, 1966 now abandoned.

This invention relates to the manufacture of superconductive solenoids and the like (electromagnets, armatures, magnetic shields, etc) and superconductive transmission lines and more particularly to the wire used in winding such devices. The art to which our invention relates involves the transport of electrical currents on the order of hundreds of amperes carried with zero resistance by utilizing the phenomenon of superconductivity.

The present state of the art is that the wires used are made of niobium-zirconium or niobium-titanium alloys, the allow wire being in a single wire form or an a stranded wire cable form. The wires are prepared by metallurgical techniques described, for instance, in the patent of Kneip, et al., U.S. Pat. No. 3,215,569 and in the U.S. Pat. of Wong. No. 3,162,943 (see also Olsen et al., article pp. 123–128 of Superconductors (Interscience, 1962). After manufacture of the wire, it is mated with a normally conductive metal such as copper by plating in the manner described in the application of Kneip, Ser. No. 389,639, filed Aug. 14, 1964 now abandoned and U.S. Pat. No. 3,328,271; by providing sheets of conductive metal between winding layers of the final coil device as in U.S. Pat. No. 3,187,235; or by embedding the wire in the surface of a copper ribbon as described by Kantrowitz, et al. in six Applied Physics Letters 56 (Feb., 1965) and in French Pat. No. 1,440,228 and OFHC Copper News, volume 8, no. 1 (July 1968) page 23. The technique has also been published (Geballe U.S. Pat. No. 3,109,963) for plating copper on a superconductive alloy wire prior to the final cold drawing passes. The purpose of the copper is to act as an insulator for the superconductor under some conditions of operation and to serve as a thermal and electric shunt for the superconductor under other conditions of operation.

The conductive metal may be copper, as noted above, or gold, tin, silver, indium, lead, aluminum, cadmium, iron and combinations thereof and the superconductor, used in combination therewith may be an alloy of niobium-titanium (10–90 weight per cent titanium); niobium-zirconium or niobium-titanium zirconium, with from zero up to about 10 per cent of other alloying elements in any of the foregoing.

We have discovered that an improved form of such conductors can be made in a composite form which is characterized by ruggedness compared to the prior art wires. Our composite conductor is also characterized by a strong metallurgical bond between the superconductor(s) and the copper (or other normal state conductor therein) compared to the mechanical bond obtained in most prior art products. Our composite conductor is also characterized by excellent electrical and thermal stability and by a high critical current capability (in the superconducting state), as on the order of 1,000 to over 10,000 amperes under conditions of liquid helium temperatures and about 20 kilogauss magnetic field impinging on the wire.

A further advantage of our new product is that it allows a choice of the copper more desirable with operation of the superconductor than the conventional electrolytically deposited copper.

We provide plural superconductors in a composite conductor wherein the superconductors therein are, in effect, integrally bonded thermally and electrically for shunting electrical currents and dissipating heat. Yet, these superconductors can be positioned for most efficient cooling through the copper. The process of making our product eliminates the need for a separate stranding process needed for conventional cables. We make the composite conductor of the invention using hot and cold working techniques on a matrix metal of normal state conductor containing superconductor rods therein. Preferably, we start with a billet of copper having a long axis. We drill holes in the copper parallel to the axis. These holes are arranged in a circular array about the axis. Rods of superconductor alloy are inserted in the holes. Then the billet is extruded to a reduction in cross-section area of several fold (e.g., final cross section area one-twentieth original area). After this, the material is cold swaged down to wire size. Then the wire is drawn to a final size. At the final dimension the wire may be flattened to a rectangular form or used in its drawn geometry. Preferably, the final composite wire is heated to about 400° C for Nb-Ti and 600° C for Nb-Zr to further improve the metallurgical bond and to improve the electrical properties of the superconductors and soften the copper to improve its conductivity. The resultant product is a composite conductor in the form of a wire, round or flat, which has the following description: The overall copper wire has a diameter or minimum cross section dimension on the order of one-tenth of an inch and 10 to 90 percent of the cross-section area of the wire is copper, depending on the stability requirements of the composite.

It is surprising that the encased superconductive wires survive the abovedescribed working operations to provide such good electrical and mechanical properties in the final composite product. While the mechanisms involved are not entirely understood, it is believed that the extrusion and swaging operations improve the attainable critical current level by improving thermal and electrical contact between the copper and by the better quality of copper (high conductivity) and the "perfect" connections between superconductors. Another benefit of the present invention is that one also can put a greater percentage of copper into the composite for effective shunting than was ever possible before. The final (composite) wire product can be handled for purposes of fabricating large coils in much the same manner as plain copper wires of comparable size. This allows practical and economic fabrication of large coils. It will be apparent that the final product also has utility for other applications, such as superconductive power and communication transmission lines.

Accordingly, it is the object of our invention to provide a superconductive product consisting of a composite superconductor with a conductive metal major wire of conductive metal containing minor wires of superconductive material therein and to provide a method of making such a product.

Other objects, features and advantages will, in part, be obvious and will, in part be specified below.

The present invention has no relation to the low field superconductors such as elemental tantalum, niobium, tin, lead, mercury, etc., which have much lower superconductive capabilities and find their primary applications in low current electronics applications. The present invention has no relation to the known brittle alloy superconductors such as niobium stannide or vanadium gallide which present a different set of handling and manufacturing problems compared to the niobium alloy wires utilized to advantage in the present invention, at low cost and with relative ease of manufacture and use.

The invention is now disclosed in detail with respect to a preferred embodiment described with reference to the accompanying drawings wherein.

Figure 1:
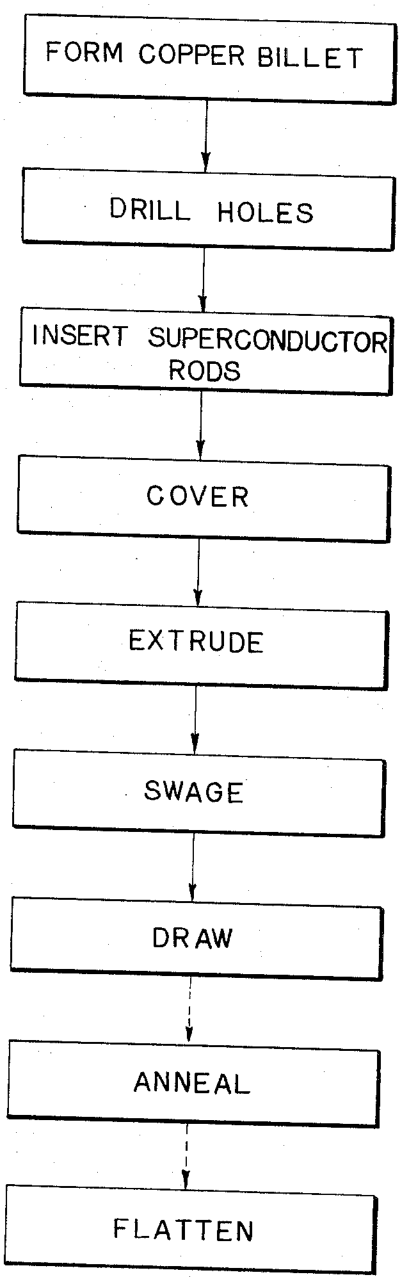
FIG. 1 is a flow diagram of a preferred embodiment of the process for making our composite wires.
Figure 3:
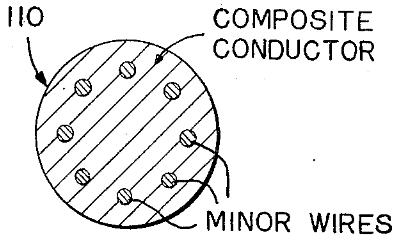
FIG. 3 is a cross-section of the composite wire.
Figure 4:
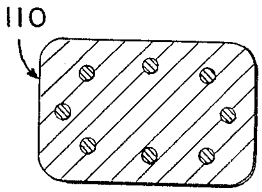
FIG. 4 is a cross-section of a flattened composite wire.

Referring now to the block diagram of FIG. 1, the process steps start with forming the extrusion billet. The completed billet has the form shown at 10 in FIG. 2. A starting bevel 12 is machined on the front of the billet. A shallow base 14 and an annular groove 16 are provided on the rear end of the billet. Long holes 18 parallel to the billet axis are drilled through the billet. The distribution of these holes is shown in FIG. 2A. Then rods of niobium base alloy superconductor are inserted in the holes 18. The open ends of the holes are covered by a zirconium foil 20 and a covering cap 22 which rest in the groove 14 and the lip 24 of the cap is welded to the lip 26 of the billet. The composite billet is extruded,swaged and drawn or rolled down to wire size. Then the resultant composite wire is heat treated. The resultant product is shown in FIG. 3. If desired, the wire may be flattened to the rectangular cross-section shown in FIG. 4.

Typical operating conditions for the preferred embodiment of the method of producing our new wires are as follows: The initial billet diameter is 3.5 inches and its length is 12 inches. The holes are sized to provide 10 percent of cross-section area for the superconductor rods; for instance, five or six drill holes of about half-inch diameter. The superconductor used is niobium-48wt. percent titanium. The copper is dead soft OFHC grade. The rods are sized to fit snugly into the drill holes. The extrusion is carried out at 1,200° F (3 hours preheating) through a three-quarter inch die. After the extrusion step, minor wire diameters are each about one-tenth of an inch within the three-quarter inch major wire. The swaging is carried out cold and in 15–20 percent area reduction, per pass to reduce the major wire diameter to about 0.3 inches. Then the final cold drawing is carried out at about 15–20 percent area reduction per pass to produce the final major wire diameter of 0.1 inches. The final heat treatment is 350°–400° C for 3–4 hours. The minor wire diameters are now about 0.01–0.015 inches. The major wire is flattened by drawing through a rectangular die.

Figure 5:
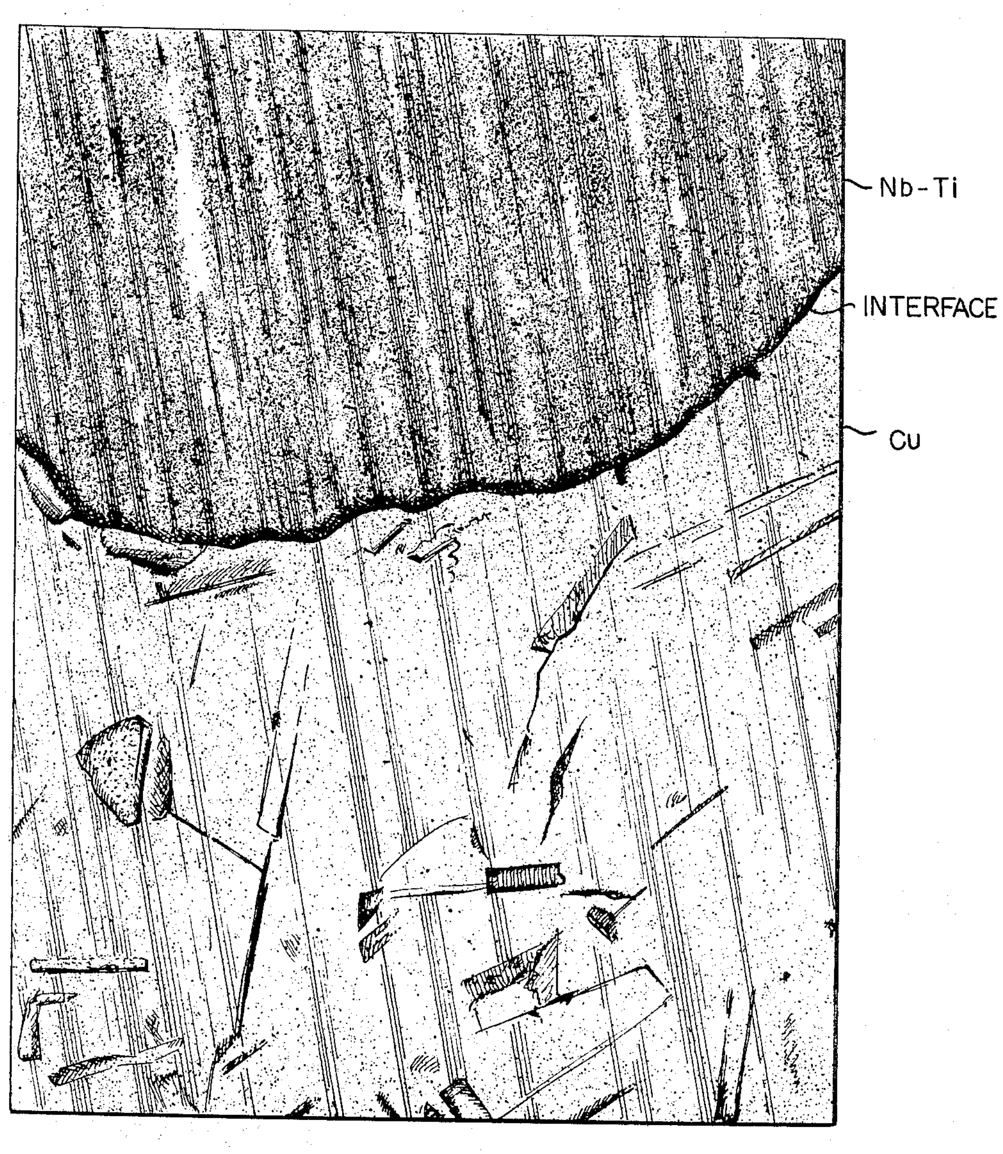
FIG. 5 is a photomicrograph of a section of our composite wire.

FIG. 5 shows a section of a wire made according to our invention. The magnification is 500X. The upper dark area is niobium-titanium wire. The lower light area is copper. The thin black line separating the two major areas is copper-titanium alloy. The bond appears perfect visually.

Figure 6:
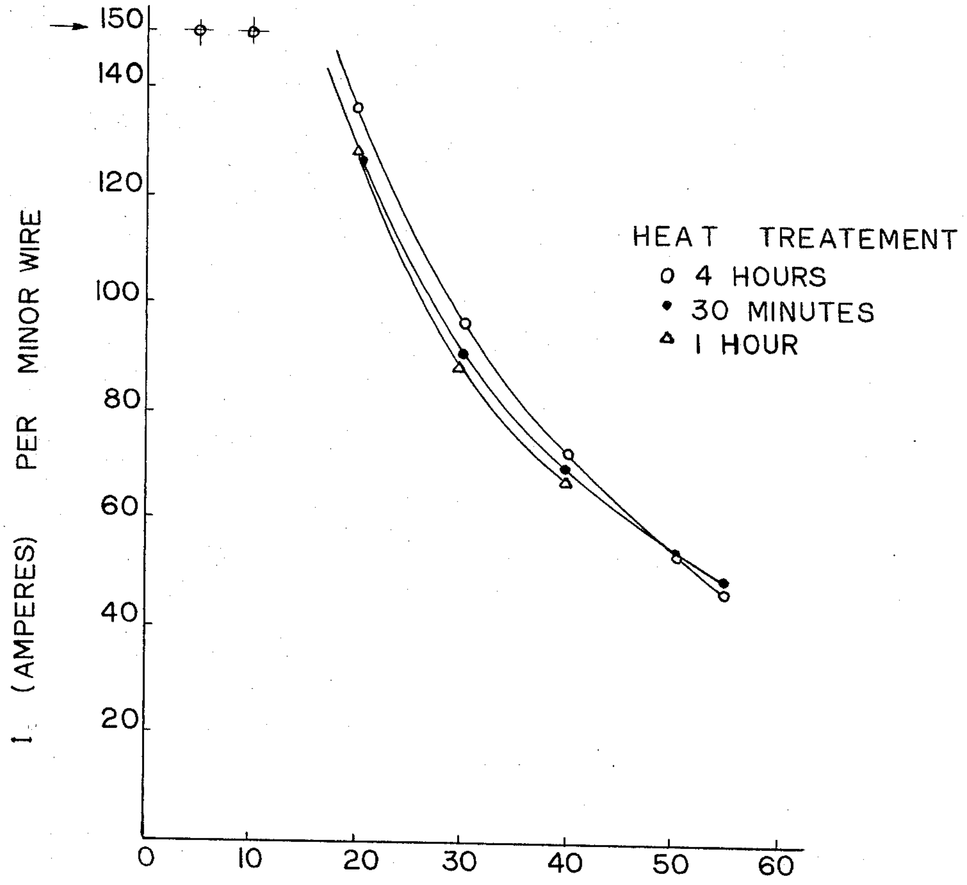
FIG. 6 is a critical current curve showing the performance of the preferred embodiment.

FIG. 6 is a performance curve for several composite wires made according to our invention. The test of each composite wire is conducted by etching copper away from the major wire, leaving the minor wires exposed. Each of the minor wires are bent around the ends of a U-probe and tested for critical current in an external magnetic field and a liquid helium temperature. The x-axis of the curves is the external field and the y-axis is the critical current. The average critical current for the individual minor wires is plotted. This test technique is similar to that used in cables where the composite would carry too much current for convenient testing.

The uppermost curve is for a composite which had a final heat treatment of 400° C for 4 hours. The minor wires have diameters from 0.0131 to 0.0137 inches. The middle curve is for a composite whose final heat treatment was at 400° C for 30 minutes. The diameters of minor wires therein ranges from 0.0126 to 0.0136 inches. The lowest curve is for a composite whose final heat treatment was at 400° C for 1 hour, the diameters of minor wires therein ranges from 0.0110 to 0.0129 inches. In all three cases, the extrusion was carried out with 1,200° F preheat. The results shown in the curves are normalized for 0.0100 inch diameter.

The different times of heat treating give about the same results as far as the critical currents of the minor wires are concerned. But 4–5 hours of heat treatment is desirable for softening the copper of the major wire.

Those skilled in the art will now recognize the implications of these data. The niobium-titanium minor wires exhibit very high critical currents and these minor wires are multiplied in the major wire. The critical currents are truly additive because of the perfect bonding through the major wire mass.

Figure 7:
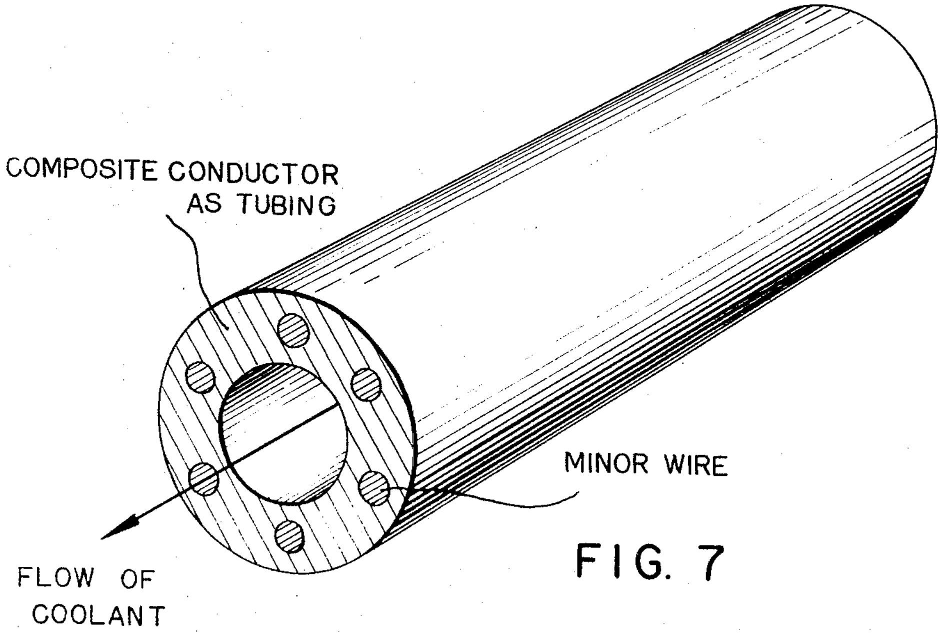
FIG. 7 is a schematic diagram of a second embodiment of our invention.

FIG. 7 indicates another embodiment of our invention. The composite conductor is produced in hollow form with a lesser degree of reduction to provide copper tubing referred to hereinafter as hollow conductor. The copper is very soft high conductivity copper suitable for use as a cryogenic magnet winding with a liquid or gaseous cryogen flowing through the tube. This tubing can also be operated superconductively by flowing an extremely low temperature cryogen inside or outside the tube. Finally, water (or no coolant at all) can be run through the tube for operation as a conventional conductor. Where only the internal coolant channel is used, the outer surface of the hollow pipe may be covered with a dielectric insulation. The potential usage of this for large magnets and transmission lines will be apparent to those skilled in the art.

Figure 2:
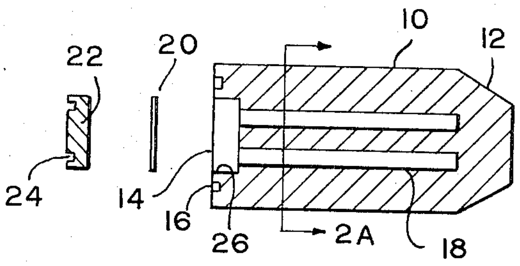
FIG. 2 is a schematic exploded view of an extrusion billet used in FIG. 1 process.
Figure 2A:
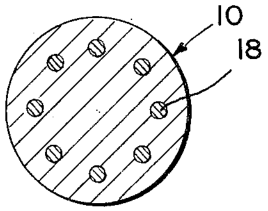
FIG. 2A is a cross-section of FIG. 2.

Another embodiment of the present invention which may be used in the manufacture of the solid or hollow conductor embodiments is that, instead of using extrusion for the initial bonding step, the initial bonding can be accomplished by swaging the assembled billet shown in FIG. 2. The swaging involves less area reduction, e.g. reducing the 3.5 inch billet diameter to about 1 inch. Subsequently, further cold swaging and/or drawing can be used, as in the preferred embodiment to reduce the composite size to final dimensions. The extrusion step of the above prior embodiments is generally preferred. But the swage-bonding approach has the advantage that it can be used with the lower melting and softer normal state metals such as aluminum and magnesium which would be more difficult to extrude in combination with the relatively hard niobium alloy superconductive rods therein.

In all the foregoing embodiments, the cold work steps subsequent to bonding are limited to cross-section area reductions of less than 25 percent. However, the initial bonding step involves a large reduction. Where extrusion is used for bonding the area reduction is at least tenfold and preferably larger. The extrusion bonding step can be facilitated by using a hard jacket, such as steel, around the extrusion billet. This is especially useful for working with the harder superconductive alloys such as Nb–25Zr. But we have routinely made composite conductors employing an annular array of less brittle alloys (Nb–48Ti) without resort to this expedient. The extrusion bonding step requires temperatures of 800°–1,600° F depending on the materials treated. We find that the ram speed for extrusion should be at least 15 inches per minute or faster, depending on the superconductor alloy. We find that we can operate at speeds in excess of 25 inches per minute with Nb–48Ti alloy going through a reduction of from 3.5 to 0.75 inch diameter at a temperature of 1,200° F.

It is a specific feature of the present invention is all the foregoing embodiments that the niobium alloy is last handled in bare form in large sizes on the order of 0.1 inches or greater in diameter (compared to about 0.01 in. dia. in the prior art manufacturing method). Thereafter the superconductors are incorporated in the relatively large and softer conductor mass, as on the order of an inch or greater in diameter (or diagonal) for further handling.

In both the solid and hollow conductor embodiments, whether round or flattened, the annular array of niobium alloy minor wires provides a strengthening effect because of their strength and hoop configuration within the conductor. This location is also suitable for cooling. It is desirable to leave the center of a solid wire clear of minor wires because this location is least accessible to an external coolant and because this location would be vulnerable to rupture during our cold work processing to produce the final composite.

It will therefore be apparent that we have disclosed a new form of composite conductor product,in several species, which is very rugged and useful for coil winding and transmission line applications, particularly for carrying current superconductively. We have also disclosed a new method of manufacturing composite conductors containing plural superconductive paths which affords the advantages disclosed above in connection with the product (better bond for stability, choice of normal metal with better properties and enhancement of the normal metal properties through working, higher strength and ruggedness) and, additionally affords a substantial advantage in manufacture in that the manufacturer need not work directly with individual fine wires of relatively brittle niobium alloy through the difficult prior art operations of drawing, plating, cabling and/or incorporating into a matrix of conductive metal. This new method also eases the inspection problems of the manufacturing operation. The new product is especially characterized by its high stability compared to prior art superconductors. The new method is especially characterized by the relative ease of working with the copper and superconductor in large dimensions and forming the composite with good bond before getting down to small sizes comparable to prior art cable sizes.

Since numerous changes may be made in the above-described embodiments of the invention, including equivalent product forms and alternative methods of manufacture or use, without departing from the spirit of the invention, it is intended that all the matter contained in the foregoing description or shown in the accompanying drawings shall be interpreted as illustrative and not in a limiting sense.

We claim:

1. A superconductor assembly comprising at least one element of a material which is superconducting at temperatures below its critical temperature, and a matrix of a thermally and electrically conductive material which is not superconducting at said critical temperature within which is at least partially embedded said element, the improvement comprising providing the assembly in hollow tubular form whereby fluid coolant can be passed through the hollow interior of the tubular form to maintain the temperature of said element below said critical temperature.

2. A superconductor assembly according to claim 1 wherein there are provided a plurality of said elements of a material which is superconducting at temperatures below its critical temperature.

3. A superconducting assembly according to claim 1 wherein there is a single thermally and electrically conductive material which is not superconducting at said critical temperature, this material being high conductivity copper.

4. A superconductor assembly according to claim 1 wherein said thermally and electrically conductive material which is not superconducting at said critical temperature is selected from the group consisting of copper, aluminum, silver and lead.

5. A superconductor assembly according to claim 1 wherein said material which is superconducting at temperatures below its critical temperature is a superconductor alloy of niobium with a metal selected from the group consisting of titanium and zirconium.

6. An electrical power conducting assembly including at least one superconducting member formed of a material which is superconducting at temperatures below a critical temperature for that material, said assembly comprising a tube having a bore defined by a wall of thermally and electrically conducting material which is not superconducting at said critical temperature, said superconducting member being at least partially embedded in the material of said wall and extending longitudinally of said wall, and means for maintaining said superconducting member below said critical temperature, said means including means for passing a cooling fluid through the bore of said tube.

* * * * *